Dec. 29, 1970  C. I. CARR ET AL  3,550,442
METHOD AND APPARATUS FOR MEASURING UNIFORMITY OF TIRES
Filed Sept. 5, 1968  8 Sheets-Sheet 6

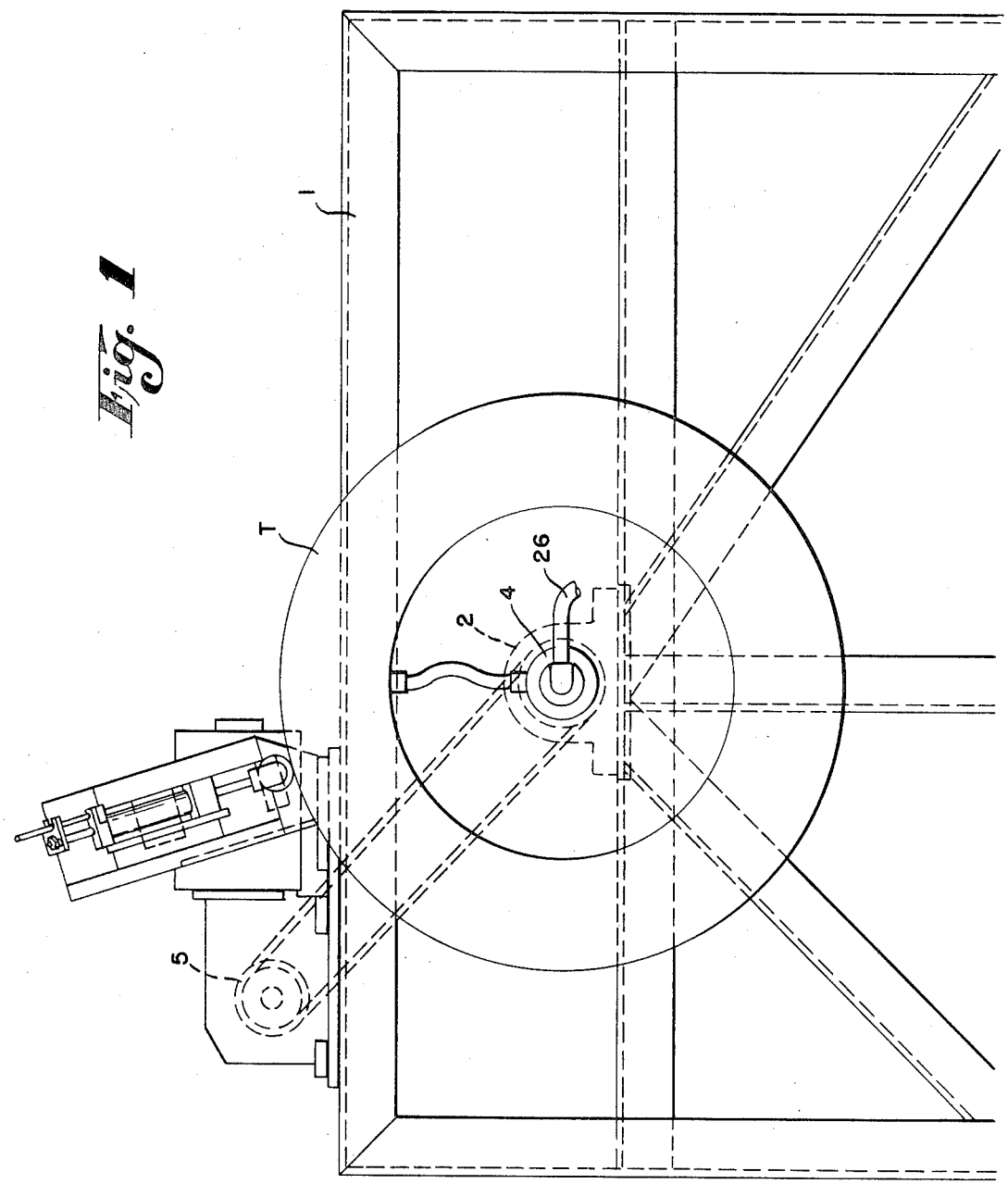

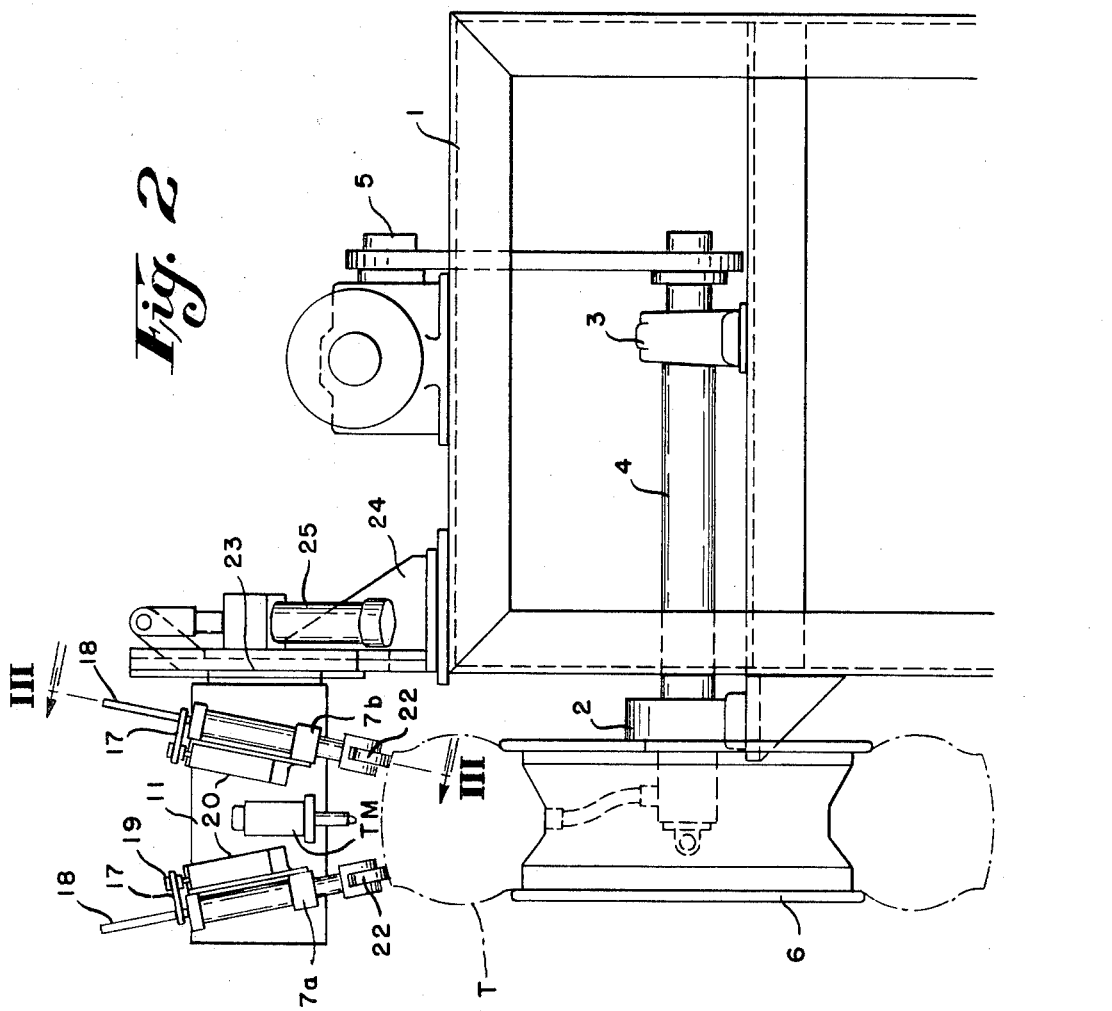
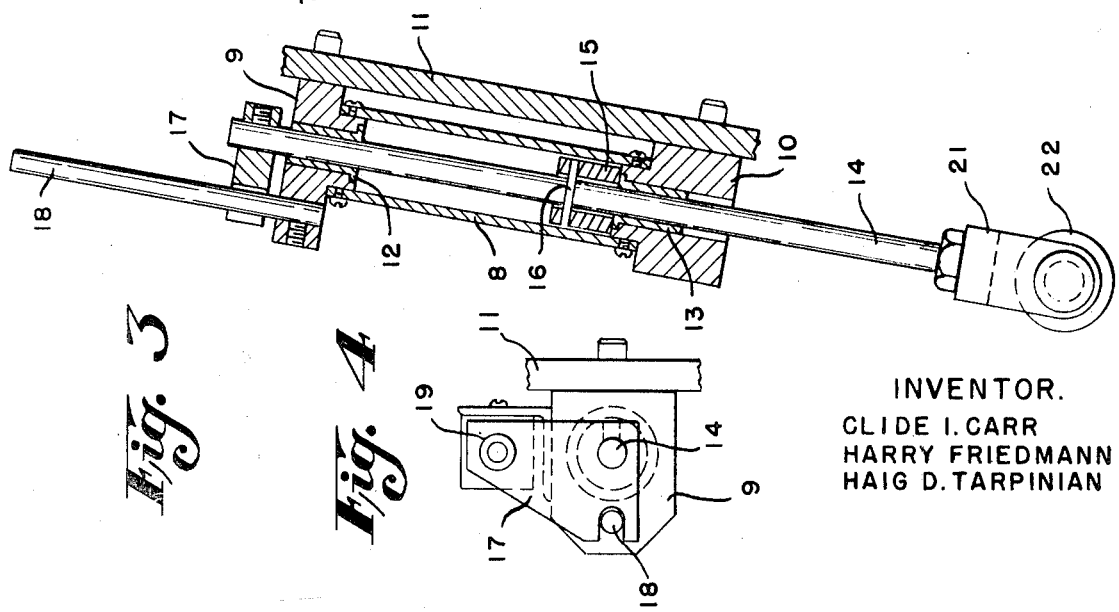
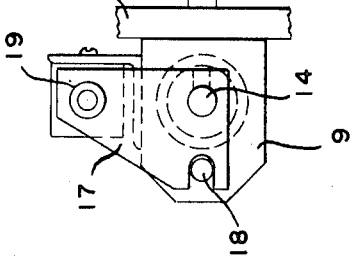

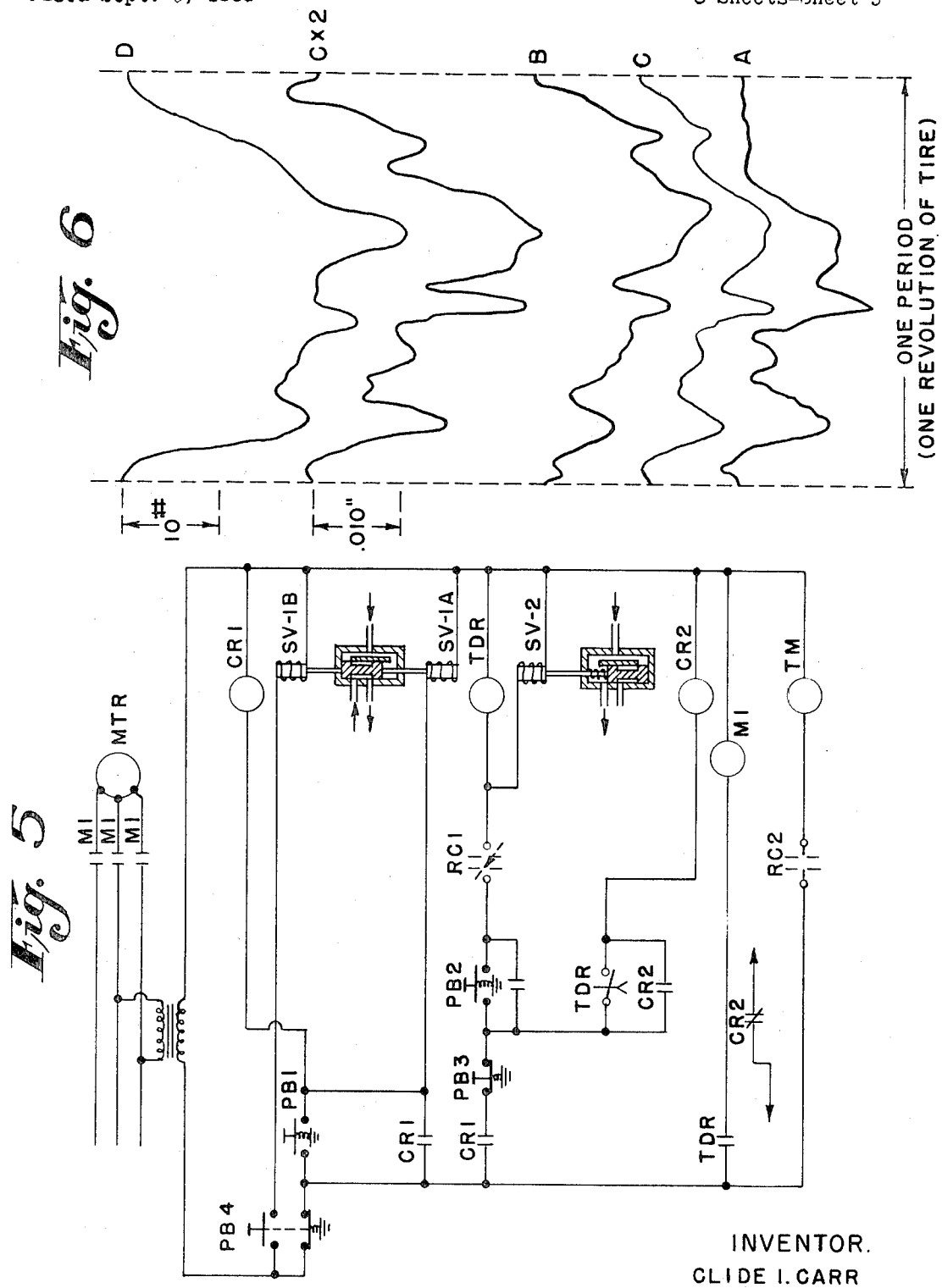

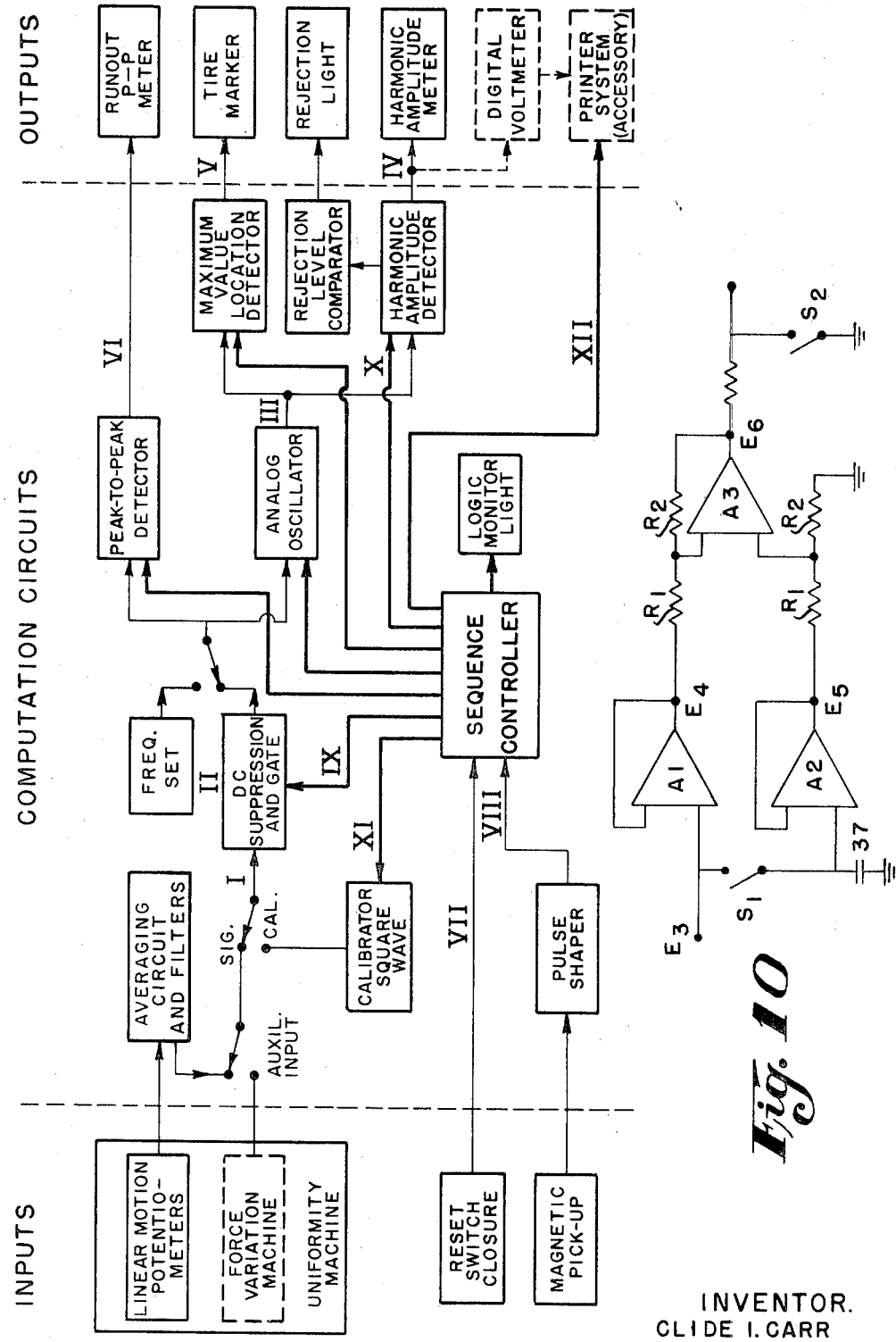

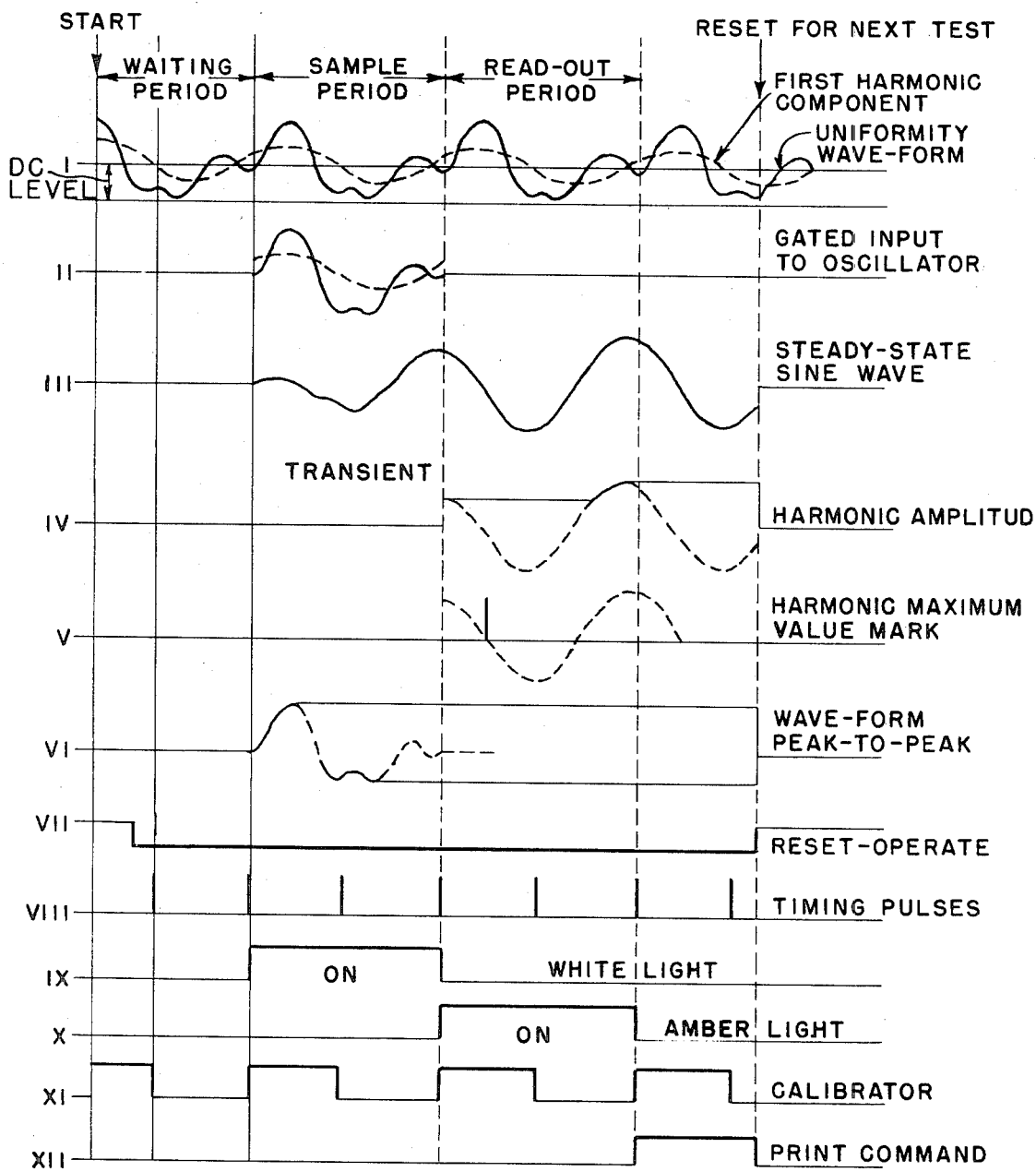
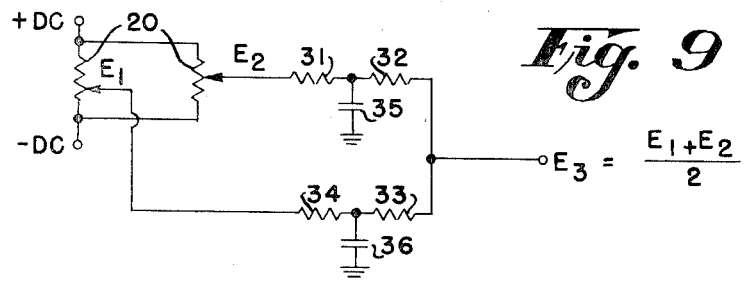

INVENTOR.
CLIDE I. CARR
HARRY FRIEDMANN
HAIG D. TARPINIAN

INVENTOR.
CLIDE I. CARR
HARRY FRIEDMANN
HAIG D. TARPINIAN

Dec. 29, 1970    C. I. CARR ET AL    3,550,442
METHOD AND APPARATUS FOR MEASURING UNIFORMITY OF TIRES
Filed Sept. 5, 1968    8 Sheets-Sheet 8

INVENTOR.
CLIDE I. CARR
HARRY FRIEDMANN
HAIG D. TARPINIAN

United States Patent Office 3,550,442
Patented Dec. 29, 1970

3,550,442
METHOD AND APPARATUS FOR MEASURING UNIFORMITY OF TIRES
Clide I. Carr, Grosse Pointe Park, Harry Friedmann, Huntington Woods, and Haig D. Tarpinian, Grosse Pointe, Mich., assignors to Uniroyal, Inc., New York, N.Y., a corporation of New Jersey
Filed Sept. 5, 1968, Ser. No. 757,663
Int. Cl. G01m 17/02
U.S. Cl. 73—146                                          17 Claims

ABSTRACT OF THE DISCLOSURE

Tire uniformity measuring method and apparatus wherein radial runout on the outer tread rows is continuously averaged electrically as the tire rotates to obtain a periodic electrical signal, the period being equal to the time for one revolution of the tire. The periodic signal is electronically analyzed with an analog oscillator circuit to obtain the maximum value of its first harmonic component and to determine and mark the location of this maximum value on the tire itself. Associated circuitry and apparatus is disclosed.

---

The invention relates to a method and apparatus for obtaining tire uniformity measurements. More specifically, the invention relates to a method and apparatus for measuring the radial runout of a tire and to apparatus for determining the magnitude of the first harmonic component of such radial runout and for determining the location on the tire of the maximum value of the first harmonic component.

It is well known in the tire and automobile industries that tire non-uniformity has a substantial adverse effect on the ride and handling characteristics of the vehicles on which such tires are mounted. For this reason, methods were early developed for measuring tire uniformity.

One method for measuring tire uniformity involves the determination of its radial runout. The term "radial runout" refers to the variation in the radius of the tire as measured when it is inflated but not under load. In order to measure radial runout, the tire may be placed on a wheel and axle assembly and slowly rotated. As the tire rotates, its tread surface contacts an indicating mechanism, such as a dial indicator or a dislpacement transducer, to thereby provide an indication of the radial runout of the tire. It has been the practice in the tire industry to make such radial runout measurements along and at or near the circumferential centerline of the tread surface of the tire. While this method of measuring tire uniformity has the advantages of being simple, fast and inexpensive, it has the very great disadvantage of not providing an adequate indication of tire performance and ride characteristics.

Another method for measuring time uniformity involves the measurement of radial force variation of the tire while it is under load. Apparatus used in making this measurement includes a wheel and axle assembly on which the tire to be evaluated is mounted and also a test-wheel which is in contact with the tire. The tire is forceably held against the test-wheel, the applied force thereby providing a predetermined load on the tire, and when the test-wheel is rotated, the tire rotates with it. As the tire rotates the variation in the radial force on the axle on which the tire is mounted is measured. This radial force variation repeats itself with each revolution of the tire. Because the radial force variation repeats itself with each revolution of the tire, it may be described mathematically as a continuous, bounded periodic function $F(t) = F(t+\tau)$ where $F(t)$ is the radial force variation as a function of time and $\tau$ is the period of rotation. Such a mathematical function may be expressed as a Fourier series, the terms of which may be combined by means of trigonometric identities to form the expression $$F(t) = C_0 + C_1 \cos(\omega t + \delta_1) + \sum_{n=2}^{\infty} C_n \cos(n\omega t + \delta_n)$$

where the frequency $\omega = 2\pi/\tau$, $\tau$ being the period; where $\delta_1$ and $\delta_n$ are phase angles of the respective terms of the infinite series; where $C_0$ is a constant; where $C_1$ is the amplitude of the first harmonic component of the periodic function $F(t)$; and where $C_n$ represents the amplitude of higher order harmonics. It has now been found by automotive and tire engineers that the value $C_1$ of the first harmonic component of radial force variation is an important factor to be considered in the evaluation of tire uniformity with respect to the performance and ride characteristics of the tire. Also the location on the tire itself of the point at which the maximum value of the first harmonic component of radial force variation occurs is of importance, knowledge of the location of this maximum value on each tire being useful in off-setting its undesirable effects. Although the measurement and determination of the location of the maximum value of the first harmonic component of radial force variation provides a useful indication of tire ride and performance characteristics, nevertheless, this method of uniformity measurement has the disadvantages of being cumbersome and of requiring the use of expensive radial force variation machines.

The method and apparatus of the present invention overcomes many disadvantages of the past utilized radial runout and radial force variation methods of measuring tire uniformity, and at the same time, combines their advantages to provide a rapid, adequate, accurate, and relatively inexpensive method for measuring uniformity of tires as related to their performance and ride characteristics.

In accordance with one aspect of the invention, a method of measuring tire uniformity includes making radial runout measurements simultaneously on the two outer tread portions or rows of a tire, the two measurements being made substantially in line with one another across the tread width, and further includes averaging the two simultaneously made measurements continuously as the tire is rotated with its tread surface in contact with measurement-sensing means. With each rotation of the tire, the average radial runout measurements are repeated, and, thus, a periodic and bounded function $F(t) = F(t+\tau)$ is produced. It has been found that there is a high degree of correlation between the first harmonic component of the average radial runout and the same component of radial force variation. This correlation applies both to the maximum values of the respective first harmonic components and to the location at which those maximum values occur. More particularly, it has been found that, for tires of the type normally used on passenger cars, one-thousandth of an inch of average radial runout is approximately equivalent to one pound of radial force variation.

In accordance with another aspect of the present invention, apparatus is provided for electrically averaging the radial runout on the outer tread portions or rows of a tire and to thereby obtain a periodic average radial runout electrical signal which is, for one period only, fed into an analog oscillator the output of which is proportional to the maximum value of the first harmonic component thereof. Moreover, circuit means are provided for detecting the point on the tire at which such maximum value of the first harmonic occurs.

An understanding of these and further aspects of the invention may be obtained from a consideration of the following detailed description in conjunction with the appended drawings, in which:

FIG. 1 is a front elevational view of a simplified machine which illustrates the method constituting one aspect of the invention;

FIG. 2 is an end elevational view of the machine of FIG. 1;

FIG. 3 is a sectional view taken along line III—III in FIG. 2, and illustrates measurement-sensing means which may be utilized to measure radial runout on the outer tread portions or rows;

FIG. 4 is a top view of the measurement-sensing means of FIG. 3;

FIG. 5 is a schematic diagram of a control circuit which may be used in conjunction with the simplified machine of FIGS. 1 and 2;

Figure 11:
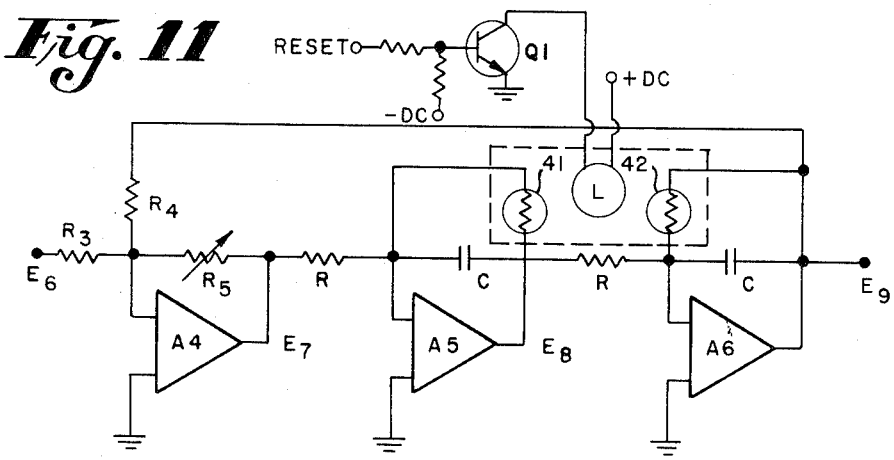
Figure 12:
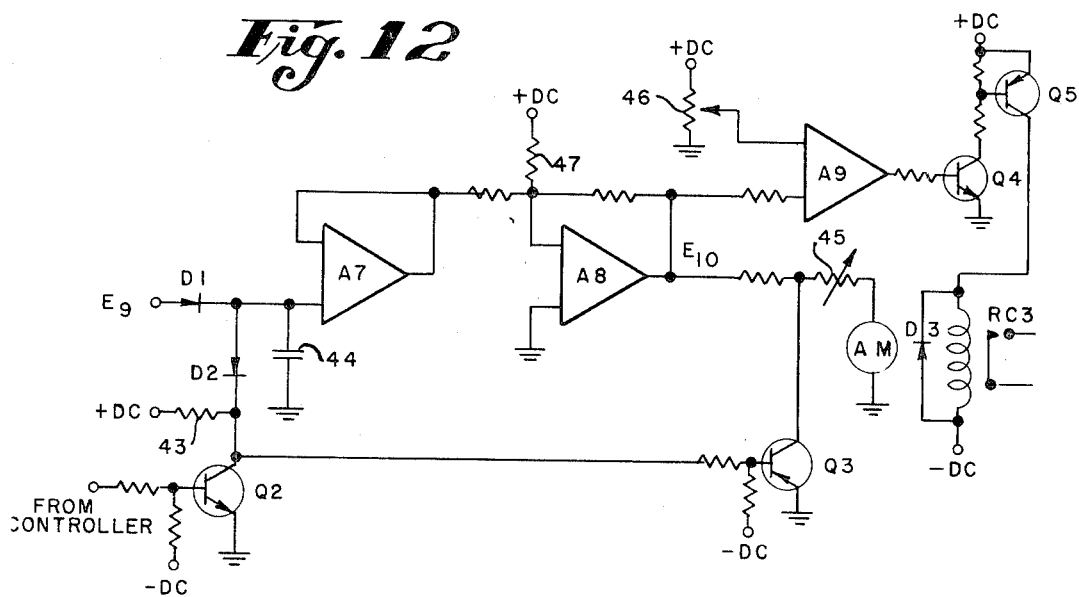
Figure 13:
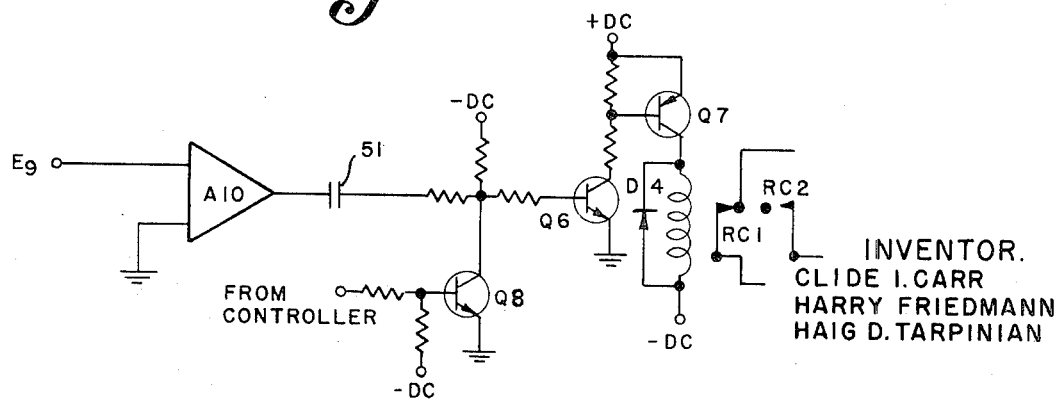
Figure 14:
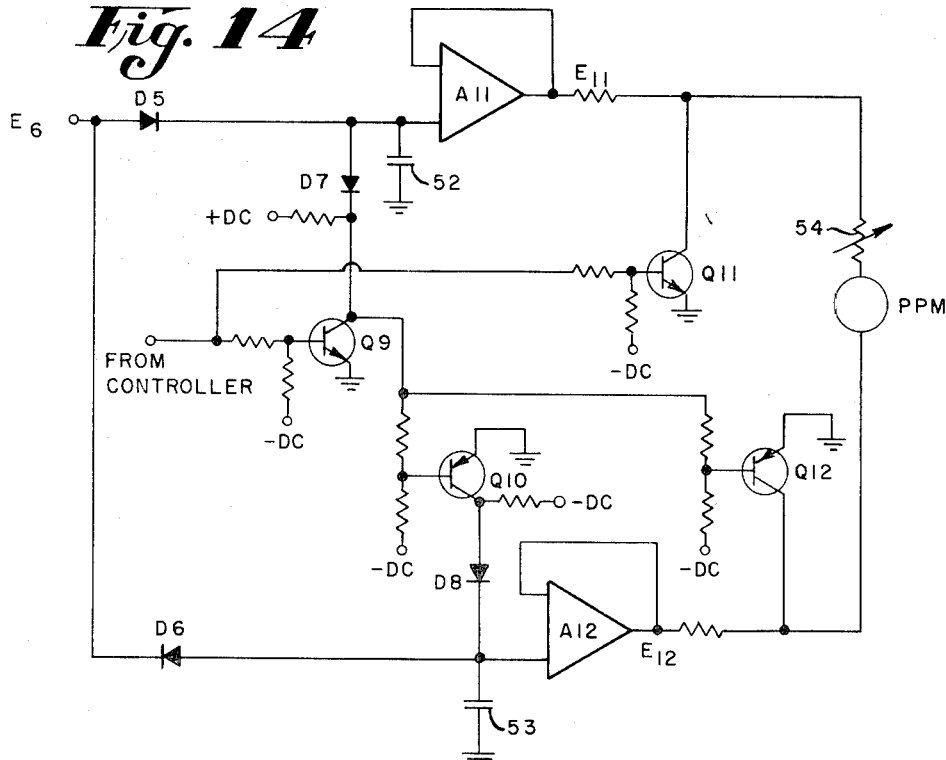
Figure 16:
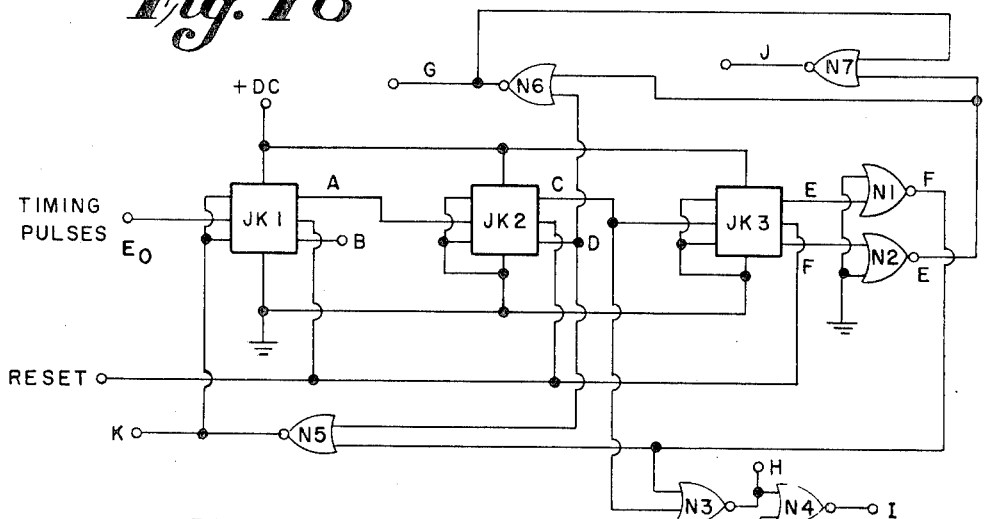
Figure 15:
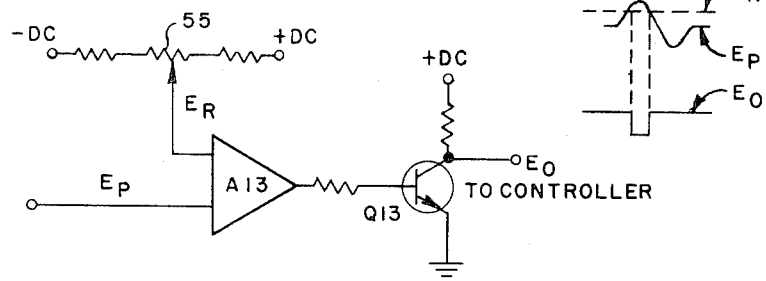
Figure 17:
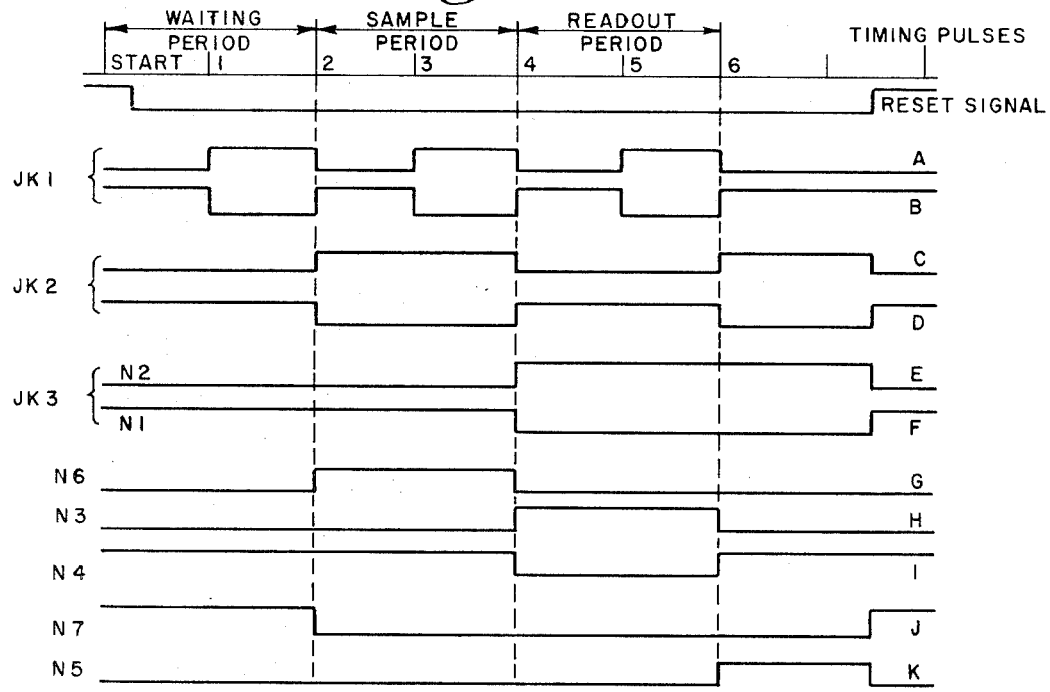
Figure 18:
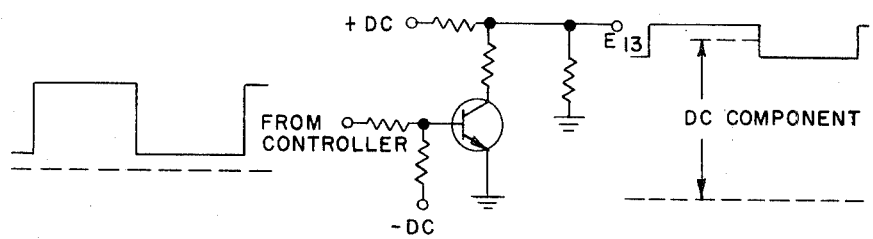

FIG. 6 contains various waveforms which illustrate the correlation between radial force variation measurements and measurements obtained by averaging continuously the radial runout on tread outer portions or rows;

FIG. 7 is a block diagram of the computation circuits which are within the confines of the invention;

FIG. 8 illustrates waveforms that occur at various points in the computation circuits, the waveforms being designated by Roman numerals which also appear at the appropriate points in the block diagram of FIG. 7;

FIGS. 9 through 19 provide detailed schematic circuit information as to those items shown in block diagram form in FIG. 7, and are as follows:

FIG. 9—averaging circuit and filters;
FIG. 10—DC suppression and gating circuit;
FIG. 11—analog oscillator circuit;
FIG. 12—harmonic amplitude detector and rejection level comparator circuits;
FIG. 13—first harmonic maximum values location detector and relay circuit;
FIG. 14—peak-to-peak detector circuit;
FIG. 15—timing-pulse shaper;
FIG. 16—sequence controller circuit;
FIG. 17—outputs of sequence-controller-circuit elements with respect to timing pulses;
FIG. 18—square-wave calibrator circuit; and
FIG. 19—logic-monitor light circuit.

Referring now to the drawings and first to FIGS. 1 and 2, there is shown apparatus which illustrates in part the practice of the method which constitutes one aspect of the invention. A frame 1 has mounted thereon bearings 2 and 3 journalling axle 4 for rotational movement. Drive means 5 are provided for slowly rotating axle 4, and wheel 6 affixed thereto, at a constant angular velocity, or speed. The tire T to be measured for uniformity is mounted on wheel 6. Measurement-sensing means 7a and 7b are provided for continuously contacting the outer tread portions or rows of the tire T.

FIGS. 3 and 4 are enlarged views of the measurement sensing means, and reference is now made thereto. A cylinder 8 is provided having end blocks 9 and 10 which, in turn, are secured to base plate 11. The end blocks 9 and 10 have bushings 12 and 13, respectively, mounted therein and through which shaft 14 passes enabling it to move axially with respect to cylinder 8. A stop 15 is attached to shaft 14 by means of roll pin 16 and is adapted to limit the axial movement of shaft 14. Also attached to one end of shaft 14 is tie member 17 which has a slot in it through which rod 18 passes, the latter serving to prevent rotational movement of shaft 14. Tie member 17 also translates the axial movement of shaft 14 to the movable element 19 of displacement transducer 20 (FIG. 2) which, preferably, is a linear motion potentiometer. At the other end of shaft 14, there is attached thereto a clevis 21 which has a small roller 22 rotatably mounted between its forked parts.

Referring back to FIG. 2, it may be seen that measurement-sensing means 7a and 7b are mounted on base plate 11 and that base plate 11 is attached to slide plate 23 which is adapted to slide in guide means provided in bracket 24 mounted on frame 1. Movement of slide plate 23, and, therefore, of measurement-sensing means 7a and 7b, toward and away from tire T is accomplished with air cylinder 25.

The operation of the above apparatus will now be described with the aid of the control circuit shown in FIG. 5.

With the measurement-sensing means 7a and 7b held in retracted position by air cylinder 25, tire T is mounted on wheel 6. Pushbutton PB1 is then depressed to simultaneously energize control relay CR1 and solenoid valve SV–1A, the energization of SV–1A causing tire T to be inflated through airline 26 (FIG. 1) which is attached to a suitable rotatable coupling of the wheel and axle assembly. Next, pushbutton PB2 is depressed to energize solenoid valve SV–2, which affects air cylinder 25 to permit the measurement sensing means 7a and 7b to contact the tread surface of tire T. Pushbutton PB2 also energizes time delay relay TDR which, in turn, locks itself in and energizes motor starter M1 which causes tire T to rotate. After a predetermined delay, during which the angular velocity of tire T becomes constant, timed contact TDR closes causing control relay CR2 to be energized and locked in by its normally-open contact. The normally-closed CR2 contact opens and provides a signal to the computation circuits (described below) to initiate processing of the signals obtained from the linear potentiometers 20 shown in FIG. 2. Throughout the period during which tire T rotates, timing pulses for the computation circuits are provided for each 180° of rotation of the tire; preferably, these pulses are obtained from a magnetic pick-up (FIG. 7) which produces a pulse when either of two ferrous protrusions 180° apart on the axle moves in proximity to the magnetic pick-up. A cam-driven limit switch could be utilized in lieu of the magnetic pick-up.

One of the functions of the computation circuits is to determine the location on the tire of the maximum value of the first harmonic component of average radial runout. At the instant in time that the maximum value occurs, the computation circuit causes normally-open relay contact RC2 (FIG. 5) to close, thereby, energizing tire-marker solenoid TM (FIG. 5 and FIG. 2) which places a mark on the tire tread surface. The computation circuit also causes normally-closed relay contact RC1 to open; this de-energizes time delay relay TDR, solenoid SV–2, and motor starter M1, and causes the tire T to stop its rotation and further causes the measurement-sensing means 7a and 7b to move away from the tire. Pushbutton PB3 is then depressed to reset the control and computation circuits for the next tire uniformity measurement. When pushbutton PB4 is depressed, tire T deflates and may then be removed from wheel 6.

The simplified apparatus and control circuit therefor which have been thus far described are primarily intended to be broadly illustrative of the method which constitutes a part of the invention. Apparatus is known by the inventors to be commercially available which will automatically mount and inflate a tire, start it rotating, actuate measurement-sensing means, and deflate and remove the tire. It is believed to be well within the skill of the art to adapt the present invention to such automatic apparatus.

It is now necessary to describe in much more detail the method of measuring average radial runout and the computation circuits employed in determining the maximum value and location of the first harmonic component of average radial runout.

With the reference to FIG. 2, it may be seen that rollers 22 of the respective measurement-sensing means 7a and 7b are in contact with the outer tread portions or rows of tire T. As shown in FIGS. 2 and 3, the force of gravity may be sufficient to gently urge roller 22 against the tread surface; however, it may be necessary to provide means, such as spring force, for urging the measurement sensing means against the tread surface, as would be the case where the tire to be measured is mounted horizontally rather than vertically as shown.

As tire T rotates, variations in its radius (radial runout) produce corresponding displacement variations in the respective measurement-sensing means 7a and 7b which variations are, in turn, converted into electrical signals by means of linear motion potentiometers 20. These variations are generally not the same on one side of the tire as they are on the other side thereof, and, thus, the two electrical signals produced by the respective potentiometers 20 also differ. The two signals may, however, be continuously averaged, using circuit means described below, to obtain an average radial runout electrical signal. This average radial runout signal is periodic, with a period equal to the time for one revolution of tire T, because the variations in tire radius are repeated with each revolution of the tire.

FIG. 6 contains four waveforms, labeled A, B, C and D, which were obtained as a result of radial runout and radial force variation measurements made on a bias-ply, passenger-car tire. Waveform A shows one complete period of radial runout of the outer tread row on one side of the tire only; waveform B shows a complete period of radial runout of the tread row on the opposite side of the tire; waveform C shows a complete period of average radial runout of the tire, the average being taken by continuously adding together, as the tire rotates, the radial runout measurements of both outer tread rows and then dividing the sum by two. To illustrate, if waveforms A and B are added together point by point and the sums averaged, then waveform C will be obtained.

Waveform D shows the tire's radial force variation, measured in pounds of force. Comparison of waveform C (shown double size), the average radial runout, with waveform D establishes the similarity between the two measurements. Furthermore, it may be seen from the scales at the sides of the waveforms that one-thousandth of an inch of average radial runout is approximately equivalent to one pound of radial force variation. This high degree of correlation between average radial runout and radial force variation, which includes correlation of the maximum values and phase angles of the first harmonic components thereof, has been found to exist in a large quantity of tires examined for uniformity.

It was earlier stated that it is not the periodic average radial runout that is of primary interest in determining tire uniformity but, rather, the first harmonic component thereof. The computation circuits described below provide the necessary information concerning the first harmonic component of average radial runout. It must be mentioned here that the computation circuits, if desired, may also be used to determine the first harmonic component of a radial force variation signal.

FIG. 7 is a block diagram of the computation circuits and includes blocks designating the inputs to these circuits and the outputs therefrom. The Roman numerals which appear in the block diagram correspond to the waveforms so numbered in FIG. 8.

When the first harmonic component of average radial runout is being determined, the signals from the linear motion potentiometers 20 are continuously combined and averaged by the averaging circuit to obtain a periodic average radial runout signal which includes a DC component (waveform I). The DC component, which results from the DC voltage applied across the linear motion potentiometers, is then removed by a DC suppression circuit. This average radial runout signal is then amplified and, at the command of the sequence controller, gated for one period as shown by waveform II. The amplitude of this waveform is measured with the peak-to-peak detector and its output (waveform VI) is indicated on the "RUNOUT P—P METER." The gated average radial runout signal is also fed into the analog oscillator. The response of the analog oscillator to the gated input signal is transient during the "sample period," but at the start of the "read-out" period it becomes a steady-state sine wave and continues as such thereafter as shown by waveform III. The amplitude of this sine wave is proportional to the maximum value of the first harmonic component of average radial runout and is measured by the harmonic amplitude detector. If desired, the output of the harmonic amplitude detector (waveform IV) may be fed into a rejection level comparator which compares the harmonic amplitude with a predetermined reference value; if the harmonic amplitude exceeds such predetermined value, the comparator may be used to indicate this fact, such as by means of turning on a rejection light, and also to operate automatic means, such as a gate in a conveyor system, for rejection of the tire measured for uniformity and found by the comparator to be unacceptable. In addition to being fed into the harmonic amplitude detector, the sine wave output of the analog oscillator is also fed into the harmonic maximum-value location detector. This detector is of the negative-going, zero-crossing type, i.e., it detects the point, as shown by waveform V, at which the sine wave output of the analog oscillator crosses zero and then becomes negative. This point corresponds, in time, to the occurrence of the maximum value of the first harmonic component of average radial runout, and the tire marker is energized at the instant this point is reached.

The sequence controller governs the specific times during which the above described operations take place. There are two inputs to the sequence controller. They are: (1) the reset signal, as shown by waveform VII, which occurs when normally closed contact CR2 (FIG. 5) opens, and (2) timing pulses, as shown by waveform VIII, which are produced every 180° of rotation of the tire by the magnetic pick-up and which are shaped by the pulse shaper. The entire sequence of operation of the computation circuits takes place within three tire revolutions. This time is divided by the sequence controller into three consecutive periods; the waiting period lasting for at least one-half revolution, the sample period lasting for one complete revolution, and the read-out period also lasting for one revolution. Waveform IX is produced by the sequence controller during the sample period and is fed to the DC suppression and gating circuit; a suitable logic monitor light may be used to indicate the occurrence of this period. Waveform X is produced by the sequence controller during the read-out period and controls operation of the harmonic amplitude detector; a suitable logic monitor light may also be used to indicate the occurrence of this period. The sequence controller also produces a square wave, waveform XI, which drives the calibrator, and a print command signal, waveform XII, which may be used to energize an optional digital voltmeter-printer system.

The specific circuits shown in block diagram form in FIG. 7 are described in detail in the paragraphs which follow.

The details of the summing circuit and filters are shown in FIG. 9. In this circuit, linear motion potentiometers 20 are shown in schematic form. A DC voltage is applied across the potentiometers, and the voltages $E_1$ and $E_2$ from the respective arms thereof, these voltages being the radial runout signals from the respective outer tread portions of the tire being measured for uniformity, are applied across equal-valued resistors 31, 32, 33 and 34. The output $E_3$ is the average radial runout signal, including a DC component, and is equal to the sum of voltages $E_1$ and $E_2$ divided by two. Capacitors 35 and 36 are included in the circuit for the purpose of removing possible 60-cycle pick-up.

The average radial runout signal $E_3$ becomes the input to the DC-suppression and gating circuit shown in FIG. 10. The DC-suppression and gating circuit removes the DC component of signal $E_3$, amplifies the remaining signal, and gates it for one period. Although the DC component of signal $E_3$ does not contain any harmonics, its removal is necessary because, otherwise, it would, upon amplification, cause the analog oscillator to saturate.

In FIG. 10, amplifier A3 is wired as an inverting, difference amplifier; its output $E_6$ may be expressed as follows:

$$E_6 = -\frac{R_2}{R_1}(E_4 - E_5) \qquad (1)$$

where $R_2/R_1$ is the gain. Amplifiers A1 and A2 act as current amplifiers and have high input impedances and a unity voltage gain factor. When switch $S_1$ is closed, the input to amplifiers A1 and A2 is signal $E_3$, and their respective outputs are equal, that is, $E_4 = E_5$. From Equation 1, it may now be seen that the output of amplifier A3 will be zero when switch $S_1$ is closed because the voltage difference of the inputs, $E_4 - E_5$, is equal to zero. However, when switch $S_1$ is open, the DC component of the input signal $E_3$ is stored in capacitor 37. This means that the output of amplifier A2 is the DC value of signal $E_3$ and that this DC component is subtracted from signal $E_4$, $E_4$ being equal in magnitude to $E_3$, by difference amplifier A3, which also amplifies the difference signal. To summarize, when $S_1$ is closed, the output $E_6$ of amplifier A3 is zero, but while $S_1$ is open, output $E_6$ is the difference between $E_3$ and its DC component, this difference being amplified by a factor of $R_2/R_1$.

Gating of the output signal $E_6$ is accomplished with switch $S_2$. Both this switch and switch $S_1$ are operated simultaneously by the sequence controller and are open only during the "sample" period.

The output voltage $E_6$ of the DC suppression and gating circuit is fed to the analog oscillator circuit which is illustrated in FIG. 11.

The analog oscillator circuit is the electronic analog of an undamped oscillator that obeys the equation $$\ddot{\chi}(t) + \omega^2 \chi(t) = \rho F(t) \qquad (2)$$

where $F(t)$ is a forcing function, or input signal to the electronic analog, and is a function of time;

$$\ddot{\chi}(t)$$

is the second time derivative of $\chi(t)$; $\omega$ is the natural frequency of the oscillator; and $\rho$ is a gain factor on the input forcing function $F(t)$. If the forcing function $F(t)$ is periodic and bounded, as is a radial force variation or average radial runout signal, then, as was previously stated, it may be described by the Fourier series expression $$F(t) = C_0 + C_1 \cos(\omega t + \delta_1) + \sum_{n=2}^{\infty} C_n \cos(n\omega t + \delta_n) \qquad (3)$$

It may be shown mathematically that if such a forcing function is applied to the oscillator for one period only, such period being equal to $2\pi/\omega$, then the response $\chi(t)$ of the oscillator to this forcing function $F(t)$ will be $$\chi(t) = \frac{\rho \pi C_1}{\omega^2} \sin(\omega t + \delta_1) \qquad (4)$$

Thus, it may be seen that the response $\chi(t)$ of the oscillator is a sine wave of amplitude proportional to the first harmonic component amplitude $C_1$ of the forcing function $F(t)$ and of frequency $\omega$, the same as that of the first harmonic component of the forcing function $F(t)$. Also, it should be noticed that $\chi(t)$ is a sine wave and as such is $\pi/2$ radians out of phase with the first harmonic component of the forcing function $F(t)$. This means that when $\chi(t)$ is equal to zero and is about to become negative, then the first harmonic component $C_1 \cos(\omega t + \delta_1)$ of $F(t)$ is at its maximum value.

It is necessary to state here that although the analog oscillator circuit described above and hereinafter has a natural frequency $\omega$ corresponding to the first harmonic frequency of the periodic and bounded forcing function $F(t)$, this nevertheless does not limit the oscillator's usefulness to measurement of the first harmonic component of such periodic and bounded forcing function $F(t)$. Rather, if it is desired to measure the amplitude and phase angle of a predetermined higher order harmonic component of forcing function $F(t)$, then the natural frequency of the analog oscillator circuit may be adjusted, with circuit means hereinafter described, to correspond to the frequency of such predetermined higher order harmonic. The oscillator would then be the electronic analog of the equation $$\ddot{\chi}(t) + (n\omega)^2 \chi(t) = \rho F(t)$$

where $n$ designates the number of the predetermined higher order harmonic component being measured and where $\omega$ would then be the fundamental frequency of the periodic and bounded forcing function $F(t)$. If forcing function $F(t)$ were to be gated to the analog oscillator, for a single period only, as its input signal, then the analog oscillator response $\chi(t)$ would be $$\chi(t) = \frac{\rho \pi C_n}{n \omega^2} \sin(n\omega t + \delta_n)$$

As was earlier mentioned, the analog oscillator circuit is the electronic analog of Equation 2. When the gated average radial runout signal $E_6$ is applied to this circuit, this signal corresponds to the forcing function $F(t)$ and the analog oscillator output signal $E_9$ is a sine wave the amplitude of which is proportional to the maximum value of the first harmonic component of the gated average radial runout signal $E_6$.

In FIG. 11, operational amplifier A4 is wired as a summing amplifier. Its output $E_7$ is $$E_7 = -R_5 \left( \frac{E_6}{R_3} + \frac{E_9}{R_4} \right) \qquad (5)$$

where $R_3$ and $R_4$ are resistances, $E_6$ is the input signal, and $E_9$ is a feedback signal from the output of amplifier A6. Operational amplifier A5 is used as an integrator. Its output $E_8$ is proportional to the integral of its input $E_7$, that is, $$E_8 = -\frac{1}{RC} \int E_7 dt \qquad (6)$$

where $R$ is the value of resistor R, and $C$ is the value of capacitor C. Operational amplifier A6 is also an integrator. Its output is $$E_9 = -\frac{1}{RC} \int E_8 dt \qquad (7)$$

where $R$ and $C$ are resistance and capacitance values, respectively, associated with amplifier A6 and are of the same value as those indicated by Equation 6. Substituting the expression for $E_8$ from Equation 6 into Equation 7 produces the result $$E_9 = -\frac{1}{RC} \int \left[ -\frac{1}{RC} \int E_7 dt \right] dt \qquad (8)$$

or $$E_9 = \left( \frac{1}{RC} \right)^2 \int \int E_7 dt\, dt \qquad (9)$$

after differentiation twice, Equation 9 becomes $$\ddot{E}_9 + \left( \frac{1}{RC} \right)^2 E_7 \qquad (10)$$

where $\ddot{E}_9$ is the second time derivative of $E_9$. Substituting the value of $E_7$ from Equation 5 into Equation 10 gives the equation $$\ddot{E}_9 + \left[\frac{R_5}{R_4}\left(\frac{1}{RC}\right)^2\right]E_9 = \left[-\frac{R_5}{R_3}\left(\frac{1}{RC}\right)^2\right]E_6 \quad (11)$$

Equation 11 may be seen to be the electronic analog of Equation 2 wherein $E_9$ corresponds to $\chi(t)$, $E_6$ corresponds to $F(t)$, $$\omega^2 = \frac{R_5}{R_4}\left(\frac{1}{RC}\right)^2$$

and $$\rho = -\frac{R_5}{R_3}\left(\frac{1}{RC}\right)^2$$

The solution to Equation 11, when $E_6$ is gated to the oscillator for a single period only, is also similar to that for Equation 2, this solution being $$E_9 = -\frac{R_4}{R_3}\pi C_1 \sin(\omega t + \delta_1) \quad (12)$$

The natural frequency $\omega$ of the oscillator can be adjusted by varying resistance $R_5$. Since $R_5$ does not appear in Equation 12, adjustment of the oscillator frequency in this way does not affect the gain of the analog oscillator circuit. Such adjustment is necessary to make the oscillator frequency equal to the frequency of the average radial runout signal $E_6$ which, in turn, corresponds to the angular frequency of the rotating tire being measured for uniformity.

In FIG. 11, the circuit elements enclosed by broken lines are the parts of a double-pole photocell-lamp combination. The resistive elements 41 and 42 have a resistance, when they are not being exposed to light, of about 1000 megaohms, which does not affect the function of the integrators. However, when transistor Q1 is rendered conductive by the reset signal (waveform VII of FIG. 8) then lamp L is lighted and this causes the resistance of elements 41 and 42 to decrease to about only 500 ohms; this low resistance value permits capacitors C to discharge and, thereby, restores the integrating circuits of the analog oscillator to a quiescent state. Thus, the oscillator is automatically reset at the completion of each tire uniformity test and made ready for a subsequent test.

The output signal $E_9$ from the analog oscillator circuit is fed into the harmonic amplitude detector circuit shown in FIG. 12. In this circuit, when transistor Q2 is rendered non-conductive by the signal from the sequence controller, diode D2 is reverse-biased since the saturation level of amplifier A6 precludes signal $E_9$ from exceeding the positive DC voltage applied to diode D2 through resistor 43. However, diode D1 permits capacitor 44 to be charged to the maximum value of $E_9$, but blocks discharge of capacitor 44 when $E_9$ begins to decrease in voltage level. The voltage across capacitor 44 is the input to operational amplifier A7, which is a unity gain amplifier having a high input impedance that prevents appreciable leakage of charge from capacitor 44; the output of amplifier A7 would be the maximum value of signal $E_9$ were it not for the fact that the voltage across capacitor 44 differs by a small amount from $E_9$ due to the "knee" characteristic of diode D1. To compensate for this, a small voltage is added to the output of amplifier A7 through resistor 47 associated with operational amplifier A8 to which the signal from amplifier A7 is fed. The output $E_{10}$ of amplifier A8 represents the corrected maximum value of the first harmonic. Signal $E_{10}$ is designated as waveform IV in FIG. 8.

Transistor Q3 is used to hold the harmonic amplitude meter AM at zero until the beginning of the "read-out" period at which time both it and transistor Q2 are rendered nonconductive. Upon completion of the read-out period, transistors Q2 and Q3 become conductive once again.

When transistor Q2 is in the conductive state, diode D2 forms a discharge path for capacitor 44. Thus, the harmonic amplitude detector circuit is automatically reset for the next harmonic amplitude measurement.

The rejection level comparator circuit and the relay associated therewith are also shown in FIG. 12. The operational amplifier A9 is wired as a voltage comparator in that it compares signal $E_{10}$, which represents the harmonic maximum value, with a preset voltage, which is obtained from potentiometer 46 and which corresponds to the desired rejection level. If signal $E_{10}$ exceeds the preset rejection level, the output of amplifier A9 renders transistor Q4 conductive. This, in turn, places transistor Q5 in the conductive state and energizes a relay having a contact RC3 which may be used to operate an indicating light and/or to operate automatic means, such as a gate in a conveyor system, for rejection of the tire measured for uniformity and found by the comparator to be unacceptable because its first harmonic component exceeded the preset rejection level. Diode D3, which is connected across the relay coil, is used to provide a discharge path for any energy which may remain in the coil after transistor Q5 becomes nonconductive.

The circuit which appears in FIG. 13 is the first harmonic maximum value location detector and relay circuit. The input to operational amplifier A10 is signal $E_9$ from the analog oscillator circuit, signal $E_9$ being a sine wave proportional in amplitude to the maximum value of the first harmonic component of the analog oscillator input signal, but $\pi/2$ radians out of phase with it. It is this phase difference which causes the time at which $E_9$ crosses zero in a negative-going direction to coincide with the maximum value of the first harmonic component. The circuit operation is such that each time signal $E_9$ crosses zero, amplifier A10 becomes saturated, due to its very high gain, to either a positive or negative voltage level depending on the polarity of input signal $E_9$. If $E_9$ is negative-going when it crosses zero, then amplifier A10 saturates to a positive voltage level; converse is true when $E_9$ is positive-going. When amplifier A10 saturates to a positive voltage level, capacitor 51 converts this into a short positive pulse which briefly renders transistors Q6 and Q7 conductive and, thereby, energizes the relay. When the relay is energized, its normally-closed contact RC1 opens and its normally-open contact RC2 closes; as was previously described in connection with the discussion of FIG. 5, this actuates means for marking the location of the maximum value of the first harmonic on the tire itself. Diode D4 proides a discharge path for any energy which may remain in the relay coil after transistor Q7 becomes non-conductive. Transistor Q8 is included in the circuit to prevent the relay from being energized except during the "read-out" period. When transistor Q8 is in its conductive state, transistor Q6 cannot be rendered conductive by the positive pulses from capacitor 51, and the sequence controller holds transistor Q8 in such conductive state except during the "read-out" period.

The circuit for the peak-to-peak detector is shown in FIG. 14. This circuit is designed to measure the peak-to-peak value of the average radial runout or, as the case may be, radial force variation signal being fed into the analog oscillator circuit. The input to the peak-to-peak detector is signal $E_6$. This signal is applied to two essentially separate peak detectors, one for detecting the maximum value and the other for detecting the minimum value. These peak detectors functions in a manner similar to that of the previously described harmonic amplitude detector. When transistor Q9 is in a non-conductive state, its collector is at a positive DC voltage which is in excess of the saturation level of amplifier A3 (FIG. 10), the output of which is signal $E_6$. Because the voltage on the collector of transistor Q9 exceeds the input voltage $E_6$, diode D7 is reverse-biased. This permits capacitor 52 to be charged to the maximum value of signal $E_6$; diode D5 and the high input impedance of unity-gain operational amplifier A11 prevent loss of the charge built up on capacitor 52. In a similar manner, the minimum value of signal $E_6$ is stored by capacitor 53 through the actions of transistor Q10, reverse-biased diode D8, diode D6 and unity-gain operational amplifier A12. The peak value outputs $E_{11}$ and $E_{12}$ of amplifiers A11 and A12, respectively, are connected across peak-to-peak meter PPM. Variable resistor 54 is used to adjust the gain of the meter. A conductive state in transistor Q9, initiated by a signal from the sequence controller, causes transistors Q10, Q11 and Q12, to conduct, thereby, shunting off the outputs of amplifiers A11 and A12 and permitting capacitors 52 and 53 to discharge through diodes D7 and D8 which are then biased to ground through transistors Q9 and Q10, respectively. This resets the peak-to-peak detector circuit for the next measurement.

In FIG. 15, the timing-pulse shaper circuit is illustrated. As was previously mentioned, the timing pulses for the sequence controller are preferably derived from magnetic pick-up means which produces a pulse for every 180° of rotation of the tire being measured for uniformity. Such pulses do not, however, have a sufficiently rapid fall time to trigger the controller circuit which requires that the fall time be less than 100 nanoseconds. To achieve this rapid fall time, the pulses $E_P$ from the magnetic pick-up are fed into high-gain amplifier A13. In order to prevent amplifier A13 from responding to possible noise signals, it is supplied with a reference voltage input $E_R$ obtained from potentiometer 55; this reference voltage sets the trigger level of amplifier A13. When the pulse voltage $E_P$ exceeds the preset reference voltage $E_R$, then amplifier A13 produces an output which renders transistor Q13 conductive. This produces a sufficiently rapid drop in the output voltage $E_0$, taken at the collector of transistor Q13, as is illustrated by the voltage diagram shown in FIG. 15. When the input pulse $E_P$ again drops below reference voltage $E_R$, transistor Q13 ceases to conduct thereby causing a sudden rise in output voltage $E_0$. The shaped pulses thus produced are fed into the sequence-controller.

The sequence-controller circuit appears in FIG. 16. This circuit controls the sequence of events which occur in the various computation and output circuits. Preferably, the entire sequence-controller circuit is constructed with integrated circuit components. In FIG. 16, JK1, JK2, and JK3 are integrated J-K type circuit flip-flop components, and N1 through N7 are integrated circuit NOR-gate components. The upper case letters A through K, which appear at output locations of the various integrated circuit components, designate the respective outputs of these components and correspond to the letters which appear at the right-hand side of the waveforms shown in FIG. 17. In FIG. 17, the designations for the components which have the outputs indicated are placed at the left-hand sides of the waveforms. The timing pulses and reset signal waveform are also shown in FIG. 17 to indicate the time relationships of the various waveforms to one another. Waveforms VII through XII of FIG. 8 correspond to waveforms labeled "reset signal," "timing pulses," G, H, B and K, respectively, in FIG. 17.

There are two inputs to the sequence controller circuit: the reset signal obtained from normally-closed contact CR2 in the previously described machine control circuit, and periodic pulses $E_0$ obtained from the timing-pulse shaper circuit (FIG. 15). With these inputs, the sequence controller provides output B which drives the calibrator, output G which operates the DC suppression and gate circuit, output F which controls the operation of the harmonic amplitude detector, output I which enables the harmonic maximum-value detector to operate, output J which controls the waveform peak-to-peak detector, and output K which may be used to actuate a digital voltmeter-printer system upon termination of each tire uniformity measurement.

Further details of the sequence controller circuitry and operation are not presented herein since these are believed to be well within the knowledge of persons skilled in the art of digital logic circuit design.

As was stated above, output B from the sequence controller drives the calibrator, the circuit diagram for which appears in FIG. 18. Output B is a square wave generated as a result of the timing pulses which occur with each 180° of tire rotation. The calibrator circuit is simply a transistor switch circuit the output $E_{13}$ of which is also a square wave having a DC component. Square wave $E_{13}$ is used to calibrate the overall gain of the DC suppression and gating, the analog oscillator, and the harmonic-amplitude-meter circuits. As is shown in FIG. 7, the square-wave calibration signal is applied to the input of the DC suppression and gating circuit, which removes its DC component leaving only the square wave portion. Because the amplitude of the first harmonic component of a square wave is known to be equal to $4/\pi$ times the square wave amplitude, the square wave calibration signal may be made the input to the analog oscillator and the gain of the harmonic amplitude meter may then be adjusted so that a chosen meter scale reading corresponds to the amplitude of the first harmonic component thereof. Furthermore, if the square-wave amplitude is initially tailored, by proper choice of resistance values in the calibrator circuit, to correspond to a certain number of inches of average radial runout or pounds of radial force variation, then the harmonic amplitude meter will be capable of being read directly in such units.

The square-wave calibration described above is dependent upon the presupposes correct frequency calibration of the analog oscillator circuit. The natural frequency $\omega$ of the analog oscillator must correspond to the angular frequency of the rotating tire. Such frequency correspondence is achieved through use of the fact that the output of the analog oscillator will theoretically be zero if a DC-voltage input is gated to it for a time equal to one period at the natural frequency $\omega$ of the oscillator. A regulated DC voltage is gated to the analog oscillator circuit for one period at the rotational frequency of the tire. If the output of the analog oscillator, which may be measured with harmonic amplitude meter AM, is then not equal to zero, adjustment of variable resistance $R_5$ (FIG. 11) is made until the output is as nearly equal to zero as possible. At this point, the natural frequency $\omega$ of the analog oscillator corresponds to the angular frequency of the rotating tire.

Figure 19:
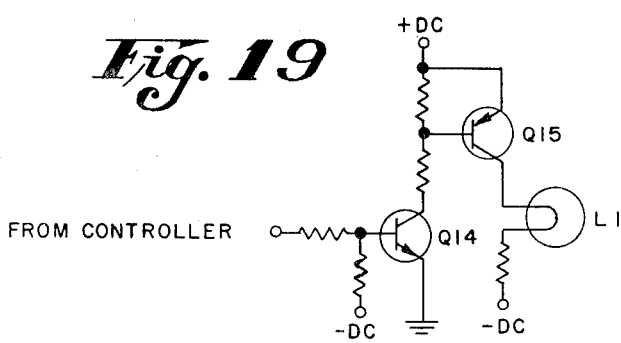

With reference now to FIG. 19, therein illustrated is a circuit which may be used to provide a visual indication of the occurrence in the computation circuits of either the "sample" or "read-out" periods. If the "sample" period is being monitored, then waveform G (FIG. 17) from the sequence controller is the input; if the "read-out" period were being monitored, then waveform H would be the input. If it is assumed that the "sample" period is being monitored, then, during this period, transistors Q14 and Q15 are rendered conductive. This causes lamp L1 to light and to remain in that condition until the end of the "sample" period.

While there has been described above a presently preferred embodiment of the method and apparatus of the invention, the invention is not restricted to the specific structural details and circuit connections herein set forth, as various modifications thereof may be effected without departing from the spirit and scope of the invention and the claims thereto.

The invention having thus been described, what is claimed and desired to be protected by Letters Patent is:

1. In the method for measuring the uniformity of a tire by determining its radial runout, the improvement which comprises:

(a) measuring the radial variation on the outer tread portions of the tire; and (b) averaging the measurements made on said outer tread portions, the averaged measurements being those made on the tread surface substantially in line with one another with respect to a line parallel to the axis of rotation of the tire.

2. In the method for measuring the uniformity of a tire wherein the tire is mounted for rotation about its own axis, inflated, rotated, and its radial runout measured, the improvement which comprises:
   (a) simultaneously and continuously, as the tire rotates at a constant angular velocity, measuring its radial runout at points substantially in line with one another across the tread width and on the two outer portions thereof; and
   (b) continuously averaging the outer tread portion radial runout measurements thus obtained.

3. In the improved method of claim 2, the additional steps of:
   electrically obtaining a periodic and bounded average radial runout signal; and
   electronically analyzing said signal to determine the maximum value, and the location thereof on the tire, of the first harmonic component of said signal.

4. A method for measuring the uniformity of a tire, which comprises:
   (a) mounting the tire for rotation about its own axis;
   (b) inflating the tire;
   (c) rotating the tire at a constant angular velocity;
   (d) contacting the two outer portions of the tread surface of the tire with measurement-sensing means capable of measuring the respective radial runouts on said two outer tread portions, said measurement-sensing means having movable elements located substantially in line with one another across the tread width and which contact the tread surface;
   (e) with the movable elements of said sensing means, simultaneously measuring the radial runouts of the tire on the outer tread portions thereof;
   (f) as the tire rotates at said constant angular velocity, continuously averaging the radial runout measurements obtained from the outer tread portions of the tire;
   (g) deflating the tire; and
   (h) dismounting the tire.

5. In the method of claim 4 and prior to deflating and dismounting the tire, the additional steps of:
   electrically obtaining a periodic and bounded average radial runout signal; and
   electronically analyzing said signal to determine the maximum value and the location thereof on the tire of the first harmonic component of said signal.

6. The method of claim 5, including the additional step of marking on the tire the location of the point at which the maximum value of the first harmonic component of said average radial runout signal occurs.

7. A method for measuring the uniformity of a tire, which comprises:
   (a) mounting the tire to be measured for uniformity on a wheel to enable it to be rotated about its own axis;
   (b) inflating the tire so mounted;
   (c) bringing two measurement-sensing means into contacting engagement with the two outer tread portions of the tire, said measurement-sensing means being located substantially in line with one another across the width of the tread surface;
   (d) rotating the tire at a constant angular velocity;
   (e) as the tire rotates, simultaneously measuring the radial runout on the outer tread portions of the tire;
   (f) as the tire rotates, continuously averaging the outer tread portion radial runout measurements thus obtained;
   (g) deflating the tire; and
   (h) removing the tire from said wheel.

8. The method of claim 7, wherein the step of continuously averaging the outer tread portion radial runout measurements is performed with electrical circuit means by which a periodic and bounded average radial runout electrical signal, having a period equal to the time for one revolution of the rotating tire, is obtained.

9. The method of claim 8, including the additional step of electronically measuring the amplitude and phase angle of the first harmonic component of said periodic and bounded average radial runout electrical signal.

10. The method of claim 9, including the additional step of marking on the tire the location of the point at which the maximum value of the first harmonic component of average radial runout occurs.

11. Apparatus for obtaining a periodic and bounded electrical signal representative of the average radial runout of a tire, which comprises:
   (a) means for rotating the tire at a constant angular velocity;
   (b) means for measuring the radial runout of the tire, as it rotates at said constant angular velocity, on its two outer tread portions;
   (c) circuit means for continuously averaging, as the tire rotates, the two outer tread portion radial runout measurements;
   whereby a periodic and bounded average radial runout electrical signal is obtained.

12. Apparatus in accordance with claim 11, wherein said circuit means for continuously averaging, as the tire rotates, the two outer tread portion radial runout measurements comprises:
   two linear potentiometers having movable arms responsive to the respective outer tread portion radial runout measurements, said linear potentiometers being connected in parallel and having a DC voltage applied thereto; and
   equal-valued resistance means to continuously provide an output voltage equal to the average of the voltages on the arms of said linear potentiometers.

13. Apparatus in accordance with claim 12, wherein said means for measuring the radial runout of the tire on its two outer tread portions comprises:
   a base plate positioned in spaced relation with respect to the location for the tire to be measured; and
   a pair of sensing means attached to said base plate, each of said sensing means having movable elements capable of continuously contracting the tread surface of the tire to be measured as it rotates, each of said sensing means being positioned on said base plate to permit the movable elements thereof to contact one of the outer tread portions of the tread surface of the tire to be measured and to permit the movable elements to respond to the radial runout of the tire at each of the outer tread portions, the movable elements of each of said sensing means being attached to the respective arms of said linear potentiometers whereby such arms are made responsive to the respective radial runouts of the outer tread portions of the tire.

14. Apparatus for measuring the uniformity of a tire, which comprises:
   (a) means for rotating the tire at a constant angular velocity;
   (b) means for measuring the radial runouts of a tire on its two outer tread portions;
   (c) circuit means for continuously averaging, as the tire rotates, the two outer tread portion radial runout measurements thereby to obtain a periodic and bounded average radial runout signal of angular frequency $\omega$ and having a DC component;
   (d) circuit means for suppressing the DC component of the average radial runout signal and for gating the thus suppressed signal for a single period;
   (e) an electronic circuit means analog of the equation $$\ddot{x}(t) + \omega^2 x(t) = pF(t)$$

the input to said electronic circuit means analog being the gated average radial runout signal and corresponding to $F(t)$ which is a function of time $t$, $p$ being a gain factor, the output of said electronic circuit means analog corresponding to $\chi(t)$ and being a sine wave signal proportional in amplitude to the maximum value of the first harmonic component of the average radial runout signal, $\ddot{\chi}(t)$ being the second time derivatives of the output $\chi(t)$, and $\omega$ being the natural frequency of said electronic circuit means analog;

(f) circuit means for measuring the amplitude of the sine wave output signal;

(g) circuit means for determining the phase angle of the sine wave output signal, such phase angle being $\pi/2$ radians out of phase with the maximum value of the first harmonic component of the average radial runout input signal and therefore indicative of its phase angle; and (h) means for marking on the tire the location of the maximum value of the first harmonic component of average radial runout.

15. Apparatus in accordance with claim 14, wherein said electronic circuit analog comprises:
   a first operational amplifier operative as a summing amplifier;
   a second operational amplifier operative as an integrator and having as its input the output from said first operational amplifier; and
   a third operational amplifier operative as an integrator and having as its input the output from said second operational amplifier, the output from said third operational amplifier constituting a feedback input to said first operational amplifier.

16. Apparatus in accordance with claim 14, which further comprises:

(i) circuit means for measuring the peak-to-peak value of the periodic and bounded average radial runout signal;

(j) circuit means for comparing the amplitude of the sine wave output signal with a predetermined rejection level value; and (k) circuit means for controlling the sequence of operations performed by the various circuit means (d), (e), (f), (g), (i), (j) hereinabove included.

17. Apparatus in accordance with claim 14, which further comprises:
   circuit means for suppling a calibration signal for calibration of the overall gain of circuit means (d), (e) and (f) of claim 14; and
   circuit means for supplying a DC voltage, gated for a single period at the angular frequency of the rotating tire, to said electronic circuit means analog to permit adjustment of its natural frequency to correspond to the angular frequency of the rotating tire.

References Cited

UNITED STATES PATENTS

| | | | |
|---|---|---|---|
| 2,812,583 | 11/1957 | Herzegh | 73—146X |
| 3,375,714 | 4/1968 | Bottasso | 73—146 |

DONALD O. WOODIEL, Primary Examiner